(12) United States Patent
England

(10) Patent No.: US 6,483,445 B1
(45) Date of Patent: *Nov. 19, 2002

(54) ELECTRONIC DEVICE WITH HIDDEN KEYBOARD

(75) Inventor: David G. England, Chandler, AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 74 days.

(21) Appl. No.: 09/219,925

(22) Filed: Dec. 21, 1998

(51) Int. Cl.[7] .................................................. G06F 1/16
(52) U.S. Cl. ........................... 341/22; 341/20; 345/168; 361/680; 361/681
(58) Field of Search ..................... 341/20, 22; 345/168; 361/680, 681

(56) References Cited

U.S. PATENT DOCUMENTS

| | | | | |
|---|---|---|---|---|
| 5,128,662 A | * | 7/1992 | Failla | 341/22 |
| 5,278,779 A | * | 1/1994 | Conway | 361/680 |
| 5,434,964 A | * | 7/1995 | Moss | 395/157 |
| 5,440,502 A | * | 8/1995 | Register | 361/681 |
| 5,644,469 A | * | 7/1997 | Shioya | 361/681 |
| 5,712,760 A | | 1/1998 | Coulon et al. | 361/680 |
| 5,821,881 A | * | 10/1998 | Fischer | 341/22 |

OTHER PUBLICATIONS

"Clio the ideal PC Companion from Vadem", Downloaded from www.vadem.com/clio/index.html on Mar. 31, 2000, 2 pages.
PCT Search Report PCT /US99/26864 Date mailed Feb. 9, 2000.

* cited by examiner

Primary Examiner—Michael Horabik
Assistant Examiner—Albert K. Wong
(74) Attorney, Agent, or Firm—Blakely, Sokoloff, Taylor & Zafman LLP

(57) ABSTRACT

A device includes a keyboard and a display. The keyboard allows entry of data into the device, and the display provides an information output. The display has a first position in which the display hides the keyboard, and the display has a second position in which the keyboard is exposed to allow entry of data via the keyboard. The display is visible to the user in both the first position and the second position.

40 Claims, 5 Drawing Sheets

ELECTRONIC DEVICE WITH HIDDEN KEYBOARD

BACKGROUND OF THE INVENTION

1. Field of the Invention

The described invention relates to an electronic device providing a display output and allowing input via a keyboard or keypad.

2. Description of Related Art

Electronic devices employing display outputs include personal digital assistants (PDA's), palm PC's (such as the Palm Pilot device manufactured by 3COM), still and video cameras, two-way pagers, and so forth. In many cases, a few navigation buttons are used to allow a user to maneuver through displayed data. These electronic devices, however, may have real estate (i.e., area) limitations that may not allow for both a keyboard/keypad and a display output. Handheld devices especially may have these real estate constraints.

If a device has real estate constraints and needs both a keyboard/keypad and a display, a compromise is made. One solution is to use a touch screen LCD to allow the input of text as well as to display images. If keyboard input is desired, a virtual keyboard is displayed on the touch screen LCD. A user can then input information via the virtual keyboard. However, this limits the portion of the touch screen LCD that can be used for displaying images (because a virtual keyboard is also being displayed).

A hinged device with a display output on one side and a keyboard on the other side is an alternate solution. This type of device allows both input from the keyboard, and simultaneous display of data and/or images. However, when the hinged device is closed, the user can no longer view displayed information from the display output.

SUMMARY OF THE INVENTION

A device includes a keyboard and a display. The keyboard allows entry of data into the device, and the display provides an information output. The display has a first position in which the display hides the keyboard, and the display has a second position in which the keyboard is exposed to allow entry of data via the keyboard. The display is visible to the user in both the first position and the second position.

BRIEF DESCRIPTION OF THE DRAWINGS

FIGS. 8A and 8B are side views. FIG. 8C is a top view.

DETAILED DESCRIPTION

An electronic device having a display that is capable of concealing a keyboard is disclosed. In a "read mode," the display is visible to a user, but the display conceals the keyboard. This mode allows easy access to data and images via the display. When the display is moved to a "full input/output (I/O) mode, the display is still visible to a user, but the display no longer conceals the keyboard. This mode allows the user to input information via the keyboard as well as view information output from the display.

Figure 1:
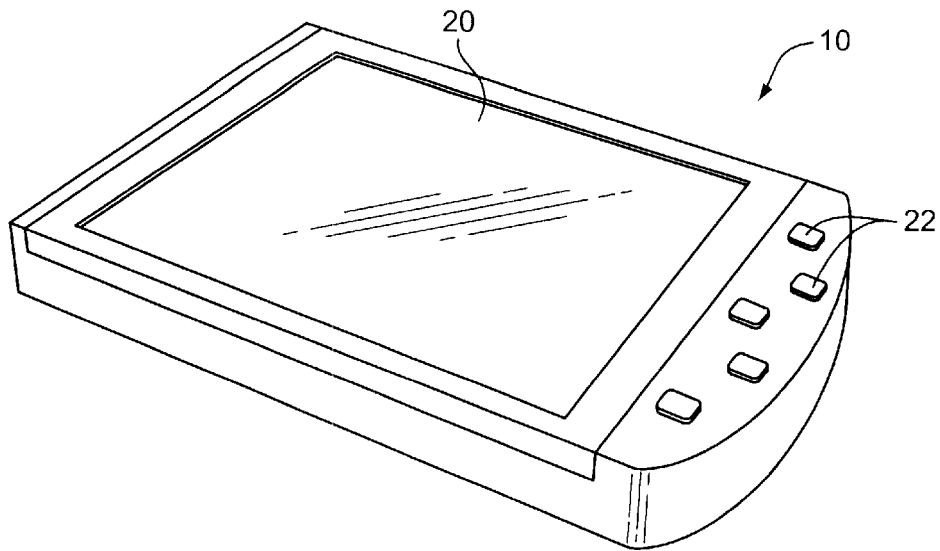
FIG. 1 shows one embodiment of an electronic device in a read only mode.

FIG. 1 shows a prior art example of an electronic device 10 having a display 20 and maneuver buttons 22. A user is able to view information on the display 20, and the maneuver buttons 22 allow limited input for scrolling through data. The information displayed may comprise pictorial information (images) or textual information (names, appointments, etc.). The "read mode" of the present invention acts the same as that of prior art FIG. 1. This read mode allows the user to conveniently access information and images from the electronic device 10.

Figure 3:
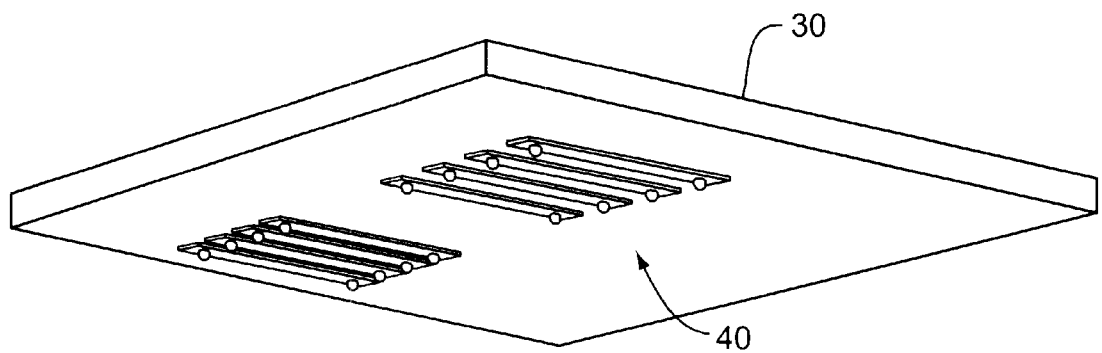
FIG. 3 shows one embodiment of the display portion of the present invention.
Figure 4:
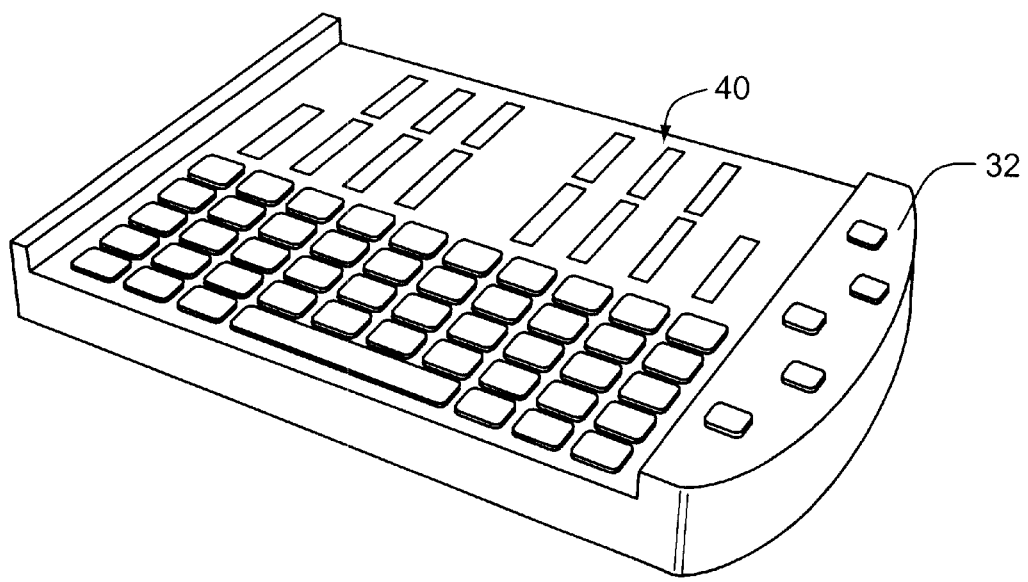
FIG. 4 shows one embodiment of a base portion corresponding to the display portion of FIG. 3.

FIG. 3 shows one embodiment of the display portion 30 of the present invention, and FIG. 4 shows one embodiment of a corresponding base portion 32 of the present invention. In this embodiment, the display portion 30 and base portion 32 include several electrical contacts 40 that provide an electrical connection between the display portion 30 and the base portion 32.

In one embodiment, the display portion 30 is a liquid crystal display (LCD), and the base portion 32 houses a processor, memory, and power source (batteries). However, in an alternative embodiment, the processor, memory and/or power source could be moved into the display portion. The power source could also be provided externally.

In one embodiment, the display portion 30 is coupled to the base portion 32 via a serial connection, such as an SPI* serial bus or an I²C* serial bus, which are well-known serial connections. (SPI is a serial bus developed by Motorola Incorporated as a peripheral interconnect standard. I²C is a serial bus developed by Philips Semiconductor.)

* Third party names and marks are property of their respective owners.

Figure 5:
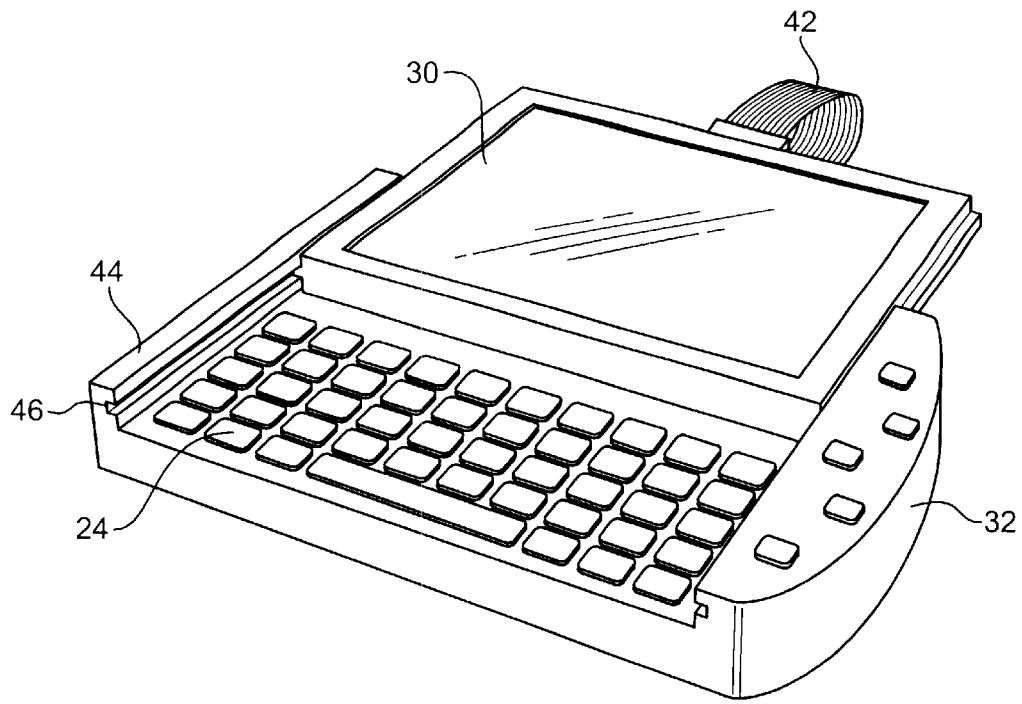
FIG. 5 shows an embodiment of electrically connecting the display portion to the base portion of the electrical device using a flexible connector.
Figure 6:
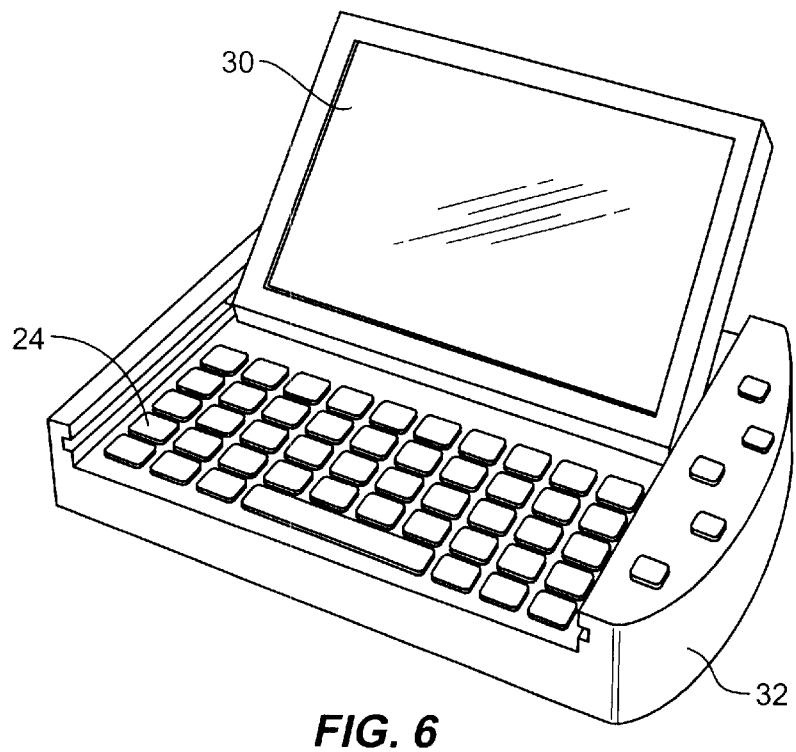
FIG. 6 shows an embodiment of mechanically connecting the display portion to the base portion using a sliding mechanical guide.

FIG. 5 shows another embodiment of electrically connecting the display portion 30 to the base portion 32 of the electrical device 10. In this embodiment, a flexible connector such as a ribbon cable 42 is connected between the display portion 30 and the base portion 32. A mechanical guide 46 such as grooves along the edges 44 of the base portion 32 (or display portion 30) is used to allow the display portion 30 to slidably move between the read mode and the full I/O mode. Rollers or ball bearings may be employed to allow freer movement within the mechanical guides. In one embodiment, the topside of the display portion 30 raises as its bottomside is moved within the mechanical guides to reveal the keyboard, as shown in FIG. 6.

Figure 7A:
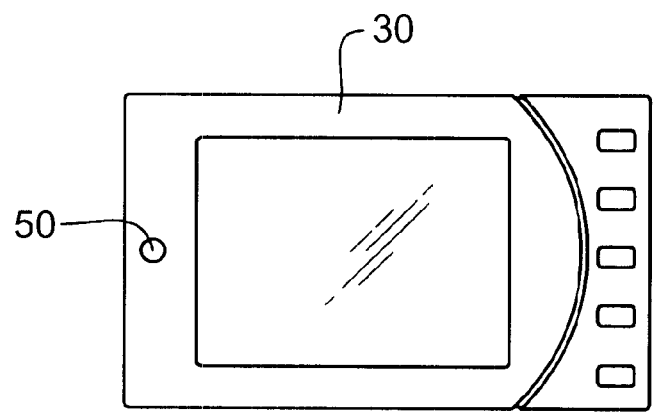
FIGS. 7A and 7B show an embodiment of a device that includes a display portion coupled to a base portion via a rod that allows the display portion to rotatably move to reveal the keyboard.
Figure 7B:
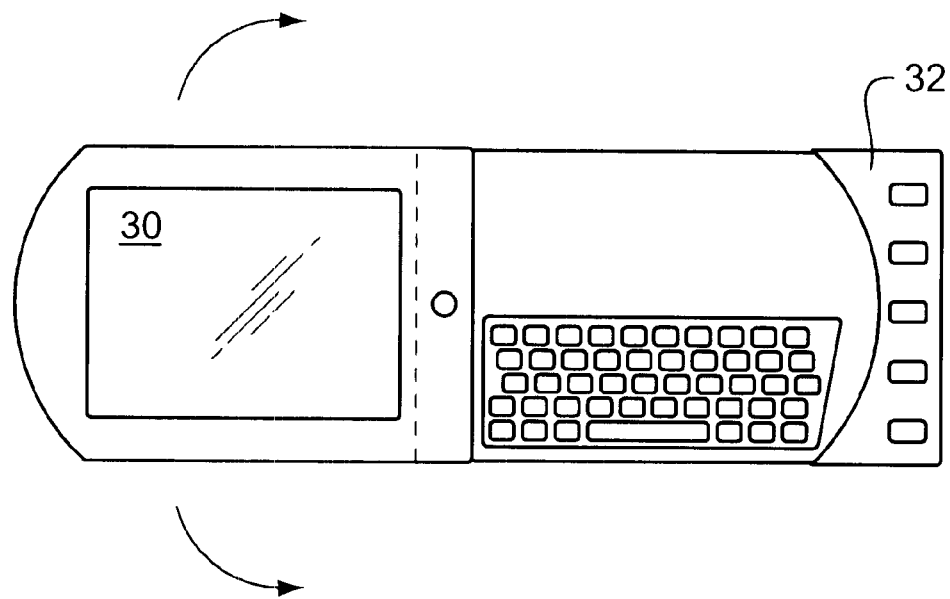

FIGS. 7A and 7B show an alternative embodiment of a device that includes a display portion 30 coupled to a base portion 32 via a rod 50 that allows the display portion 30 to rotatably move to reveal the keyboard 24. The display portion 30 may employ a curved side to allow rotatable movement. An electrical connection between the display portion 30 and the base portion 32 may be routed through the rod 50.

Figure 8A:
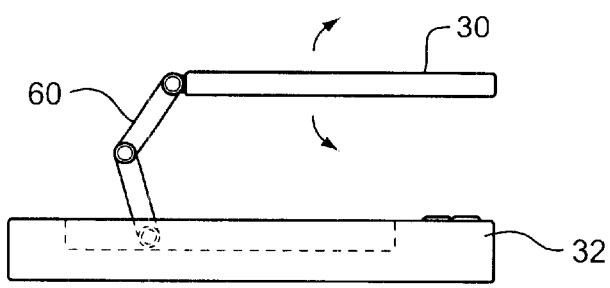
FIGS. 8A–8C show different views of an embodiment of mechanically connecting the display portion to the base portion using an arm.
Figure 8B:
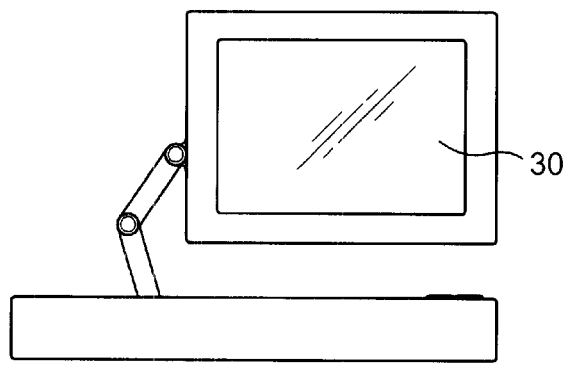
Figure 8C:
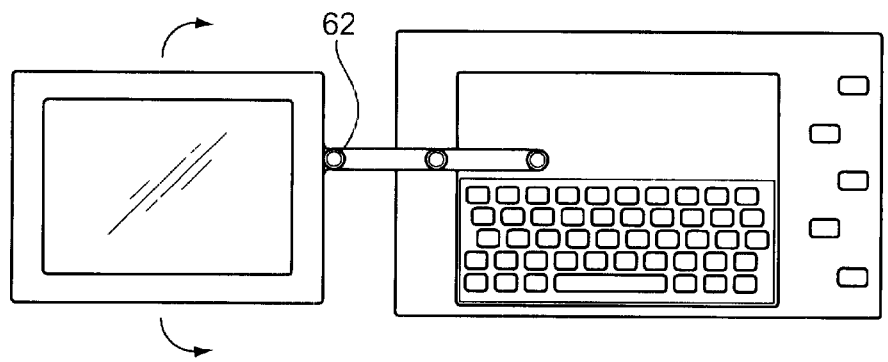

FIGS. 8A–8C show an alternative embodiment of mechanically connecting the display portion 30 to the base portion 32 using an arm 60. The arm 60 is bendable and swivels in various directions to allow the display portion 30 to be placed in different positions. An electrical connection from the display portion 30 to the base portion 32 is routed internal to the arm 60.

FIG. 8A shows a side view of the device having extendable arm 60. In its read mode, the device's display portion 30 fits within the base portion 32 as shown by the dotted lines. The display portion 30 can also be extended upwards and rotated so that the display faces the user, as shown in FIG. 8B. FIG. 8C shows a top view of the display portion 30 that has been extended outward and then rotated about pivot 62.

In one embodiment, contacts or sensors detect the position of the display portion 30 in order to present information to a user with the correct viewing orientation. For example, in the full I/O position of FIG. 7B, the device would need to display information using an orientation that is opposite to that of the read mode of FIG. 7A. Similarly, the device shown in FIGS. 8A–8C would need to detect the orientation of the display portion 30. This could be done by detecting the angle of rotation of the pivot points of the arm 60.

The present invention allows input via keyboard to a variety of different devices. For example, in one embodiment, a transmitter is added to communicate signals corresponding to characters input into the device via the keyboard, such as in a two-way pager or a cellular telephone application. In another embodiment, an optical system is added to capture one or more images, such as in a still or video camera application.

Thus, an electronic device having a display that conceals a keyboard is disclosed. The specific arrangements and methods described herein are merely illustrative of the principles of this invention. Numerous modifications in form and detail may be made without departing from the scope of the described invention. Although this invention has been shown in relation to a particular embodiment, it should not be considered so limited. Rather, the described invention is limited only by the scope of the appended claims.

What is claimed is:

1. A device comprising:
   a keyboard to enter data into the device;
   a display having a viewing surface to display information; and
   a plurality of sliding mechanisms to couple the display with the keyboard,
   wherein the display may be located in a first position in which the display hides the keyboard, and the display may be located in a second full input/output position in which the entire keyboard is exposed to allow entry of data,
   wherein the viewing surface is visible to a user in the first position and the second full input/output position,
   wherein in the second full input/output position the viewing surface of the display is substantially coplanar with an operating surface of the keyboard, and
   wherein the display is mechanically and electrically coupled with the keyboard in the first position and the second fill input/output position.

2. The device of claim 1, further comprising a base that includes the keyboard and that is mechanically and electrically connected with the display.

3. The device of claim 2, wherein the keyboard includes a majority of a total number of keys that are available to enter data.

4. The device of claim 2, wherein the keyboard includes substantially all of a total number of keys that are available to enter data.

5. The device of claim 2, wherein the display hides substantially all of a total number of keys that are available to enter data when located in the first position.

6. The device of claim 2, wherein movement of the display from the first position to the second full input/output position maintains the viewing surface substantially coplanar with the operating surface.

7. The device of claim 2, wherein the plurality of sliding mechanisms includes a first sliding mechanism on a first side of the display and a second sliding mechanism on a second side of the display.

8. The device of claim 2, wherein a sliding mechanism of the plurality includes a protrusion of the display that has a length that is at least a majority of a shortest length of the display and a coupling groove in the base.

9. The device of claim 2, wherein a sliding mechanism of the plurality includes a groove in the display that has a length that is at least a majority of a shortest length of the display and a coupling protrusion of the base.

10. The device of claim 2, wherein the plurality of sliding mechanisms include at least three sliding mechanisms.

11. The device of claim 2, wherein the plurality of sliding mechanisms include a sliding mechanism having a portion on the display to contact and slide against a portion on the base to provide an electrical connection.

12. The device of claim 2, wherein the device does not include an arm to move the display between the first position and the second position.

13. The device of claim 2, wherein the device does not include a ball joint to pivot the display relative to the base.

14. The device of claim 2, further comprising a transmitter to wirelessly communicate signals corresponding to characters input into the device via the keyboard.

15. The device of claim 14, wherein the device is a two-way pager.

16. The device of claim 14, wherein the device is a cellular telephone.

17. The device of claim 2, wherein the plurality of sliding mechanisms comprises a sliding means to couple the display to the base.

18. The device of claim 2, further comprising an electrical contact means to provide electrical contact between the display and the base.

19. The device of claim 2, wherein the base comprises a processor a memory and a power source.

20. A device comprising:
   a keyboard to enter data into the device;
   a display having a viewing surface to display information, the display having a first position in which the display hides the keyboard, and the display having a second position in which the keyboard is exposed to allow entry of data,
   wherein in the first position the display hides substantially all of a total number of keys that are available to enter data,
   wherein the viewing surface is visible to a user in both the first position and the second position;
   a mechanical guide to move the display between the first position and the second position,
   wherein the mechanical guide includes a first mechanical guide on a first side of the display and a second mechanical guide on a second side of the display,
   wherein movement of the display from the first position to the second position maintains the viewing surface substantially coplanar with an operating surface of the keyboard; and a base comprising the keyboard, a processor, and a memory, wherein the base is mechanically connected with the display.

21. The device of claim 20, wherein the second position is a full input/output position.

22. The device of claim 20, wherein the viewing surface in the first position is in a first plane substantially parallel to a second plane substantially containing the viewing surface in the second position.

23. The device of claim 20, wherein the viewing surface in the second position is substantially coplanar with the operating surface.

24. The device of claim 20, wherein the mechanical guide comprises a protrusion of the display and a corresponding groove in the base.

25. The device of claim 20, wherein the mechanical guide comprises a groove in the display and a corresponding protrusion of the base.

26. The device of claim 20, further comprising an electrical strip on the display to slide across and provide electrical contact with an electrical strip on the base.

27. The device of claim 20, wherein the mechanical guide comprises a coupling means to couple the display with the base.

28. A device comprising:
   a keyboard to enter data into the device;
   a display having a viewing surface to display information, the display having a first position in which the display hides the keyboard, and the display having a second full input/output position in which the entire keyboard is exposed to allow entry of data, wherein the viewing surface is visible to a user in both the first position and the second position; and
   a base comprising a processor, a memory, and the keyboard that is connected with the display via a single pivot point rod that allows the display to rotatably move between the first position and the second full input/output position, wherein the rod only allows movement in substantially a single plane.

29. The device of claim 28, wherein the keyboard includes a majority of a total number of keys that are available to enter data.

30. The device of claim 28, wherein in the first position the display hides substantially all of a total number of keys that are available to enter data.

31. The device of claim 28, wherein the rod directly connects the display to the base.

32. The device of claim 28, wherein the display includes a curved side that fits into a corresponding curve in the base.

33. The device of claim 28, wherein the viewing surface in the first position is in a first plane substantially parallel to a second plane containing the viewing surface in the second position.

34. The device of claim 28, wherein the viewing surface in the second position is in a first plane substantially parallel to an operating surface of the keyboard in the second position.

35. The device of claim 28, further comprising an electrical connection routed through the rod.

36. The device of claim 28:
   further comprising a sensor to detect a position of the display; and
   wherein the device uses the sensor to present information to the user with a proper viewing orientation.

37. The device of claim 30, further comprising a plurality of maneuver buttons that are not hidden when the display is in the first position.

38. The device of claim 28, further comprising a transmitter to wirelessly communicate data input into the device.

39. A device comprising:
   a base that includes a keyboard to enter data into the device;
   a display having a viewing surface to display information; and
   an attachment means to couple the display with the base, wherein the attachment means includes at least three electrical contact means to provide an electrical connection between the display and the base, wherein the keyboard includes a majority of a total number of keys that are available to enter data; wherein the display has a first position that hides the keyboard and the display has a second position that exposes the keyboard; wherein the viewing surface is visible to a user in both the first position and the second position; and wherein movement of the display from the first and the second position maintains the viewing surface substantially coplanar with the operating surface.

40. The device of claim 39, wherein the at least three electrical contact means include a first plurality of contact means on a first side of the device and a second plurality of contact means on a second side of the device.

* * * * *

UNITED STATES PATENT AND TRADEMARK OFFICE
CERTIFICATE OF CORRECTION

Figure 2:
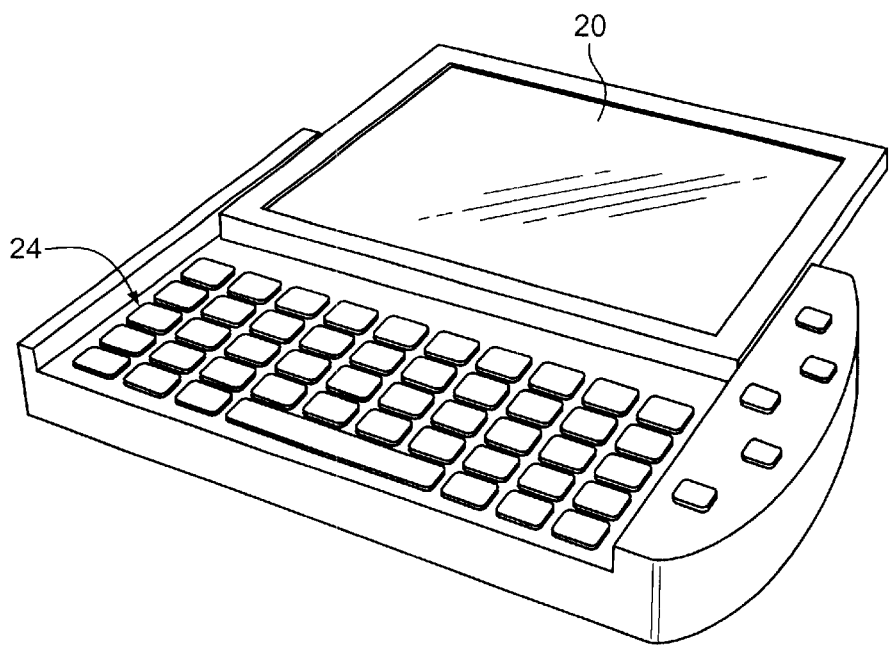
FIG. 2 shows one embodiment of an electronic device in a full I/O mode.

PATENT NO.   : 6,483,445 B1
DATED        : November 19, 2002
INVENTOR(S)  : England It is certified that error appears in the above-identified patent and that said Letters Patent is hereby corrected as shown below:

Column 2,
Lines 24-25, insert -- Figure 2 shows one embodiment of the present invention in its "full I/O mode." This mode is achieved by moving the display 20 so that it no longer conceals a keyboard/keypad 24. The keyboard/keypad 24 may provide a full character set including all letters, numbers and special characters such as that of a typewriter or computer keyboard; or the keyboard/keypad 24 may provide a simplified character set such as the keypad of a touch-tone telephone. The term keyboard will be used to denote a full character set keyboard, or any subset of a full character set keyboard in which selection of a particular button corresponds to the input of a charcter (alphanumeric or special character). In both the read mode and the full I/O mode, the display output is visible to the user. -- .

Signed and Sealed this

Third Day of August, 2004

JON W. DUDAS
*Acting Director of the United States Patent and Trademark Office*